Nov. 21, 1944.  A. A. ANDERSON  2,363,277
ADHESIVE TAPE DISPENSER AND APPLIER
Original Filed June 27, 1941  5 Sheets-Sheet 1
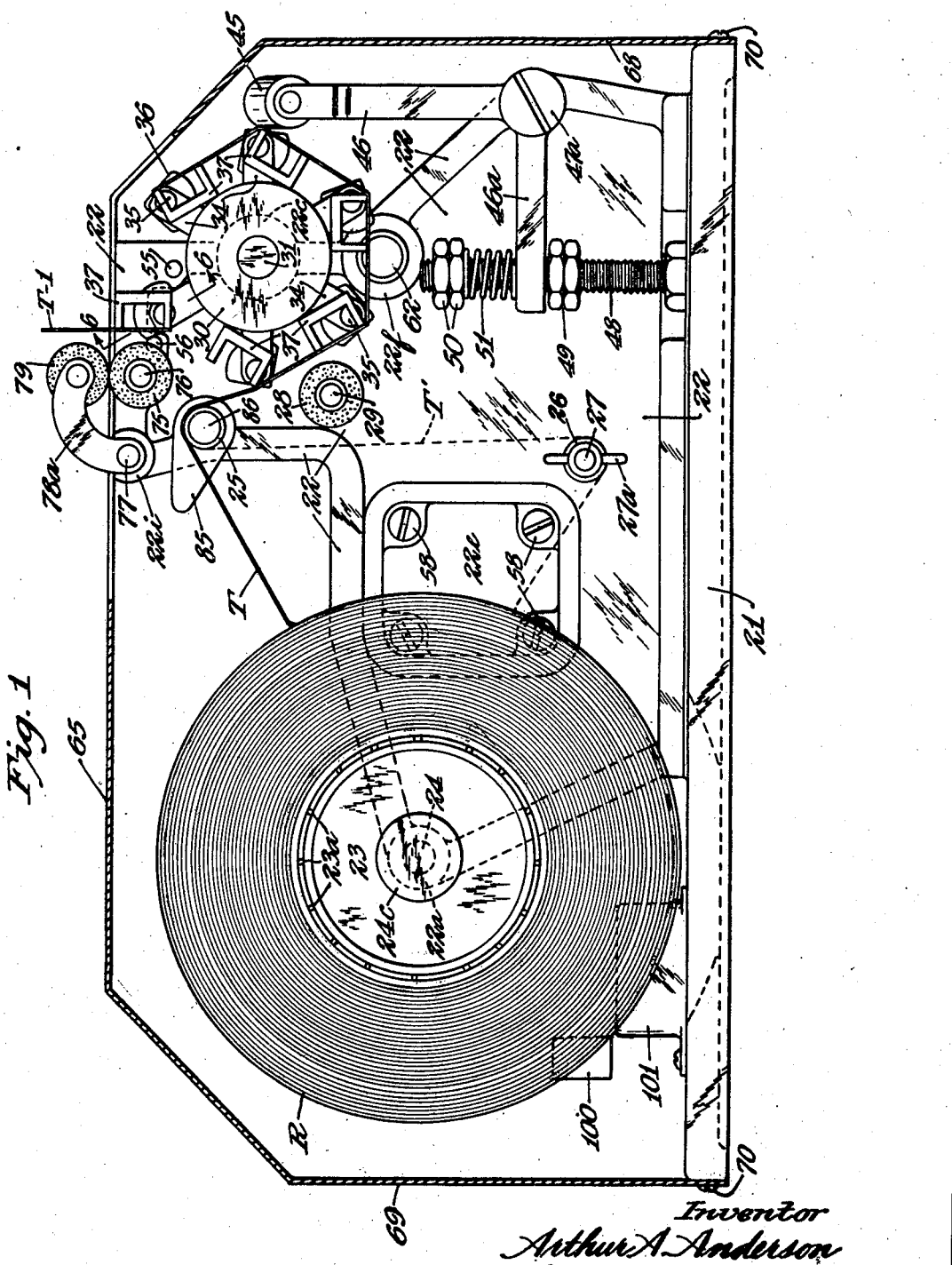

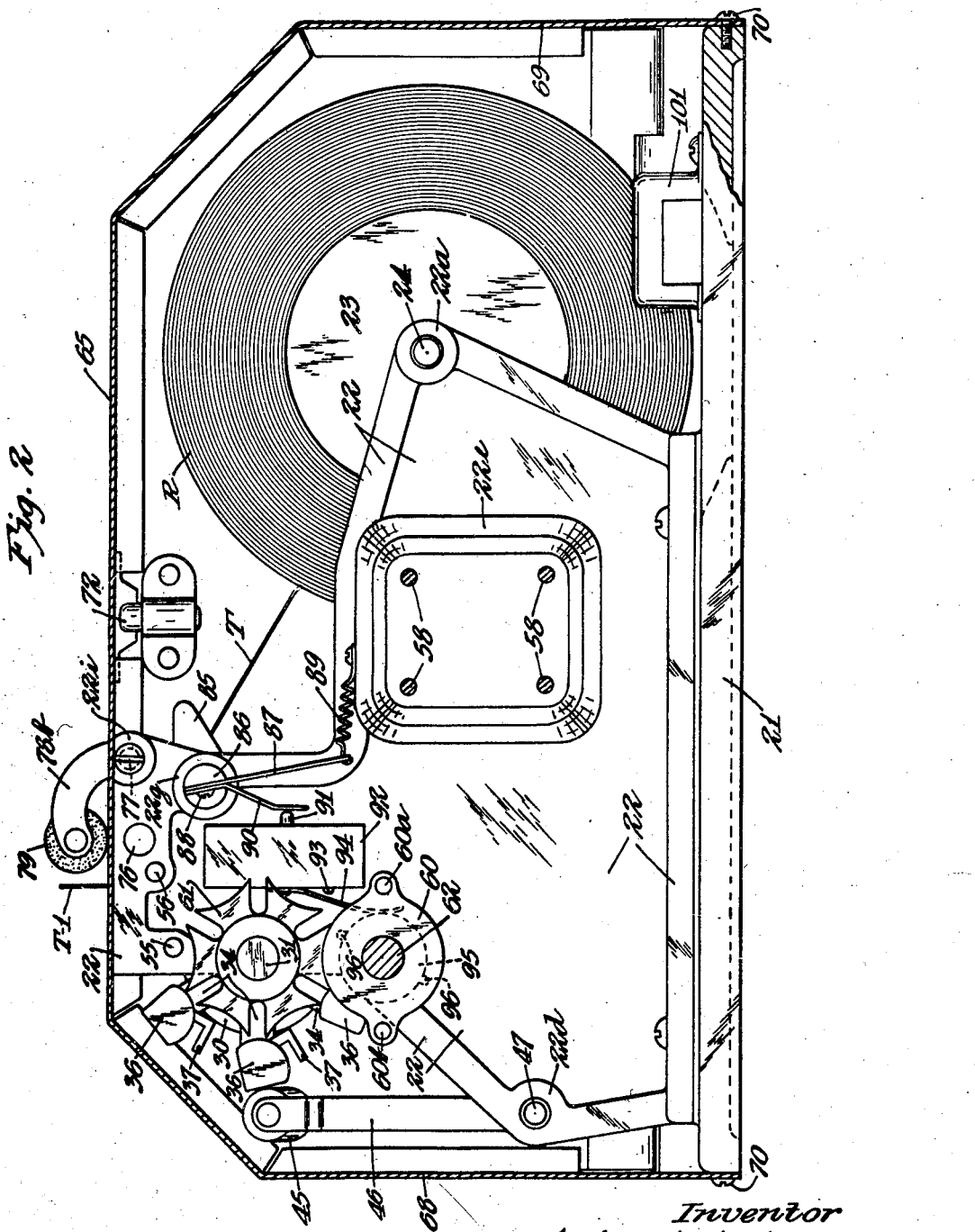

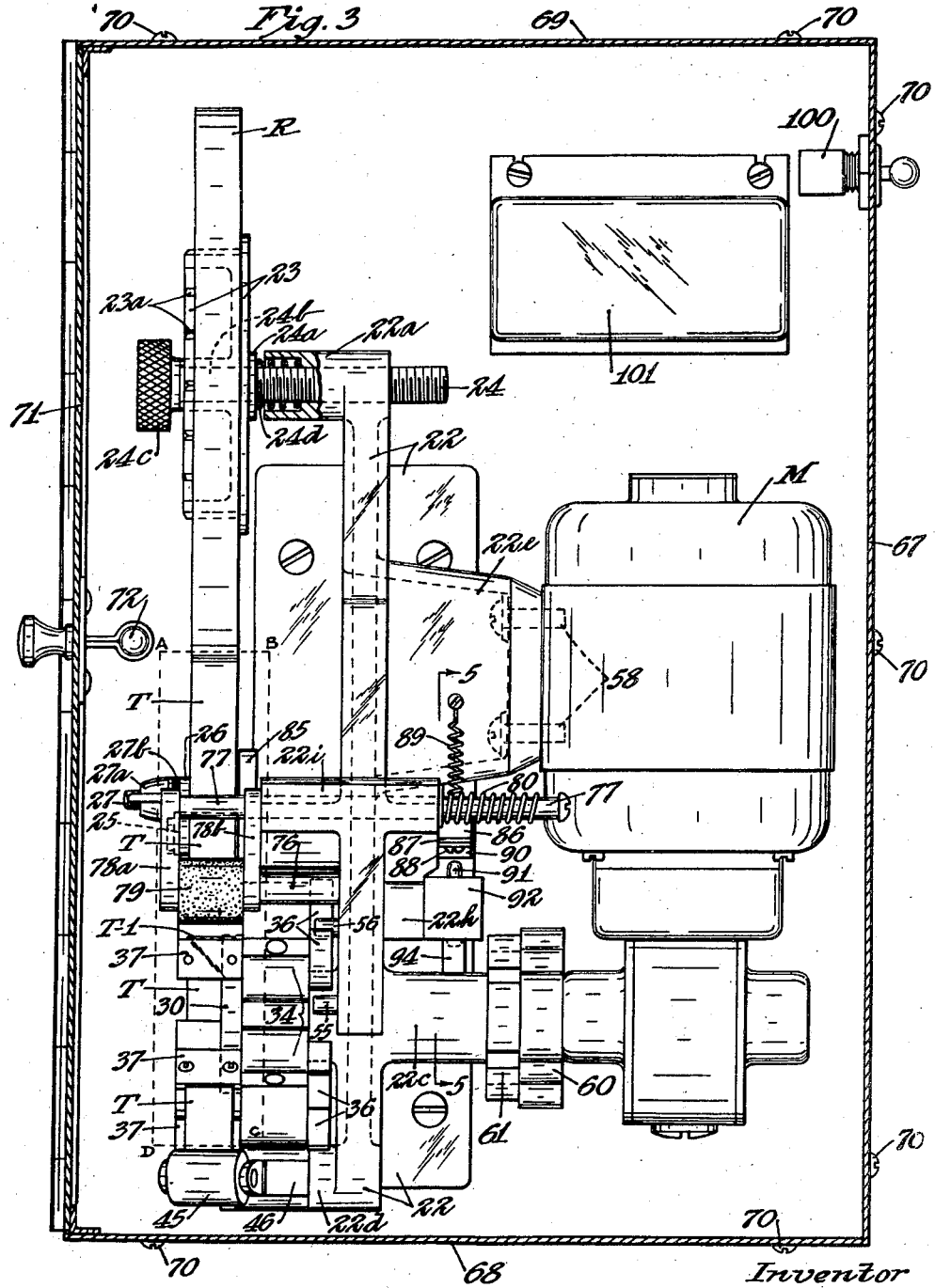

Nov. 21, 1944.   A. A. ANDERSON   2,363,277
ADHESIVE TAPE DISPENSER AND APPLIER
Original Filed June 27, 1941   5 Sheets-Sheet 4
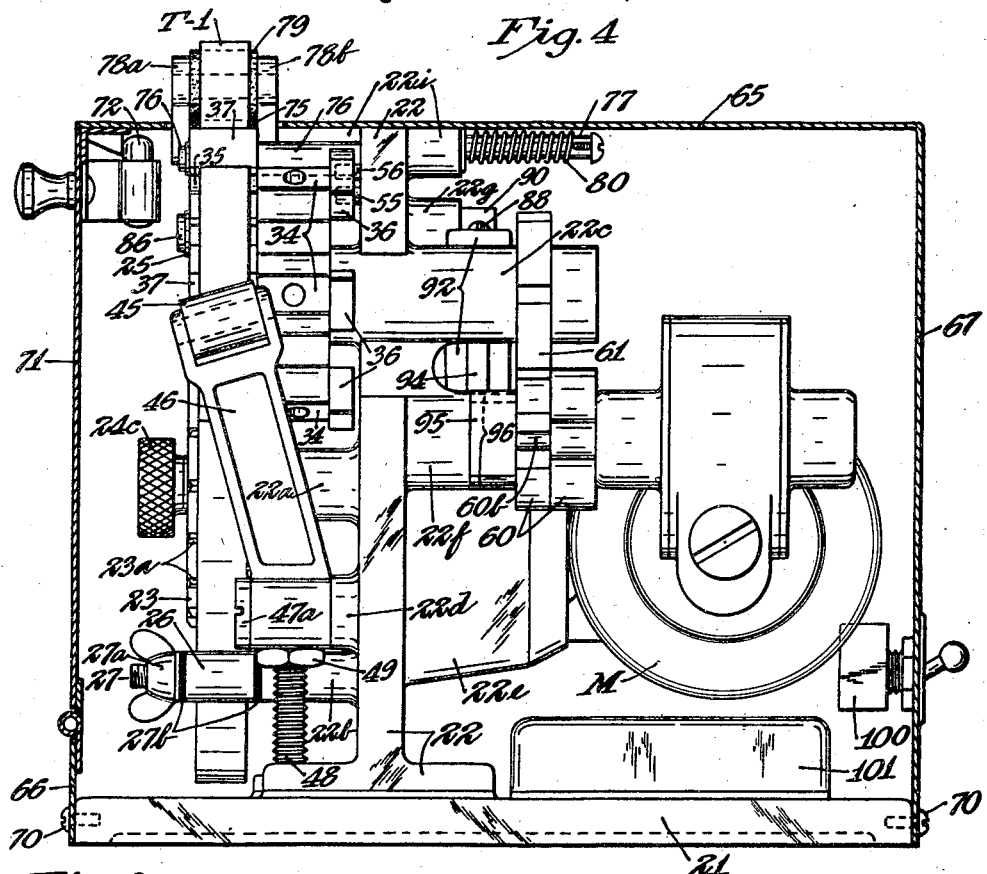
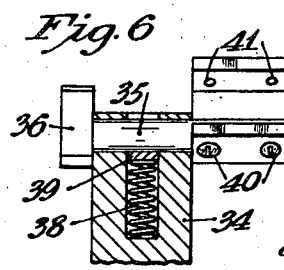
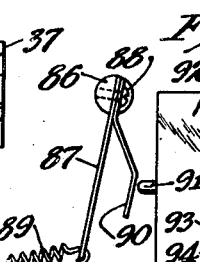
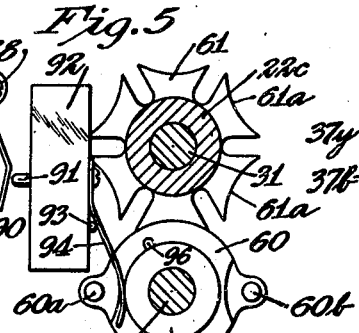
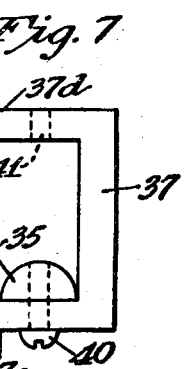
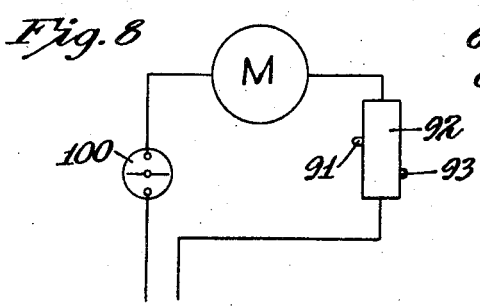
Inventor
Arthur A. Anderson
By Carpenter, Abbott, Coulter & Kinney
Attorneys

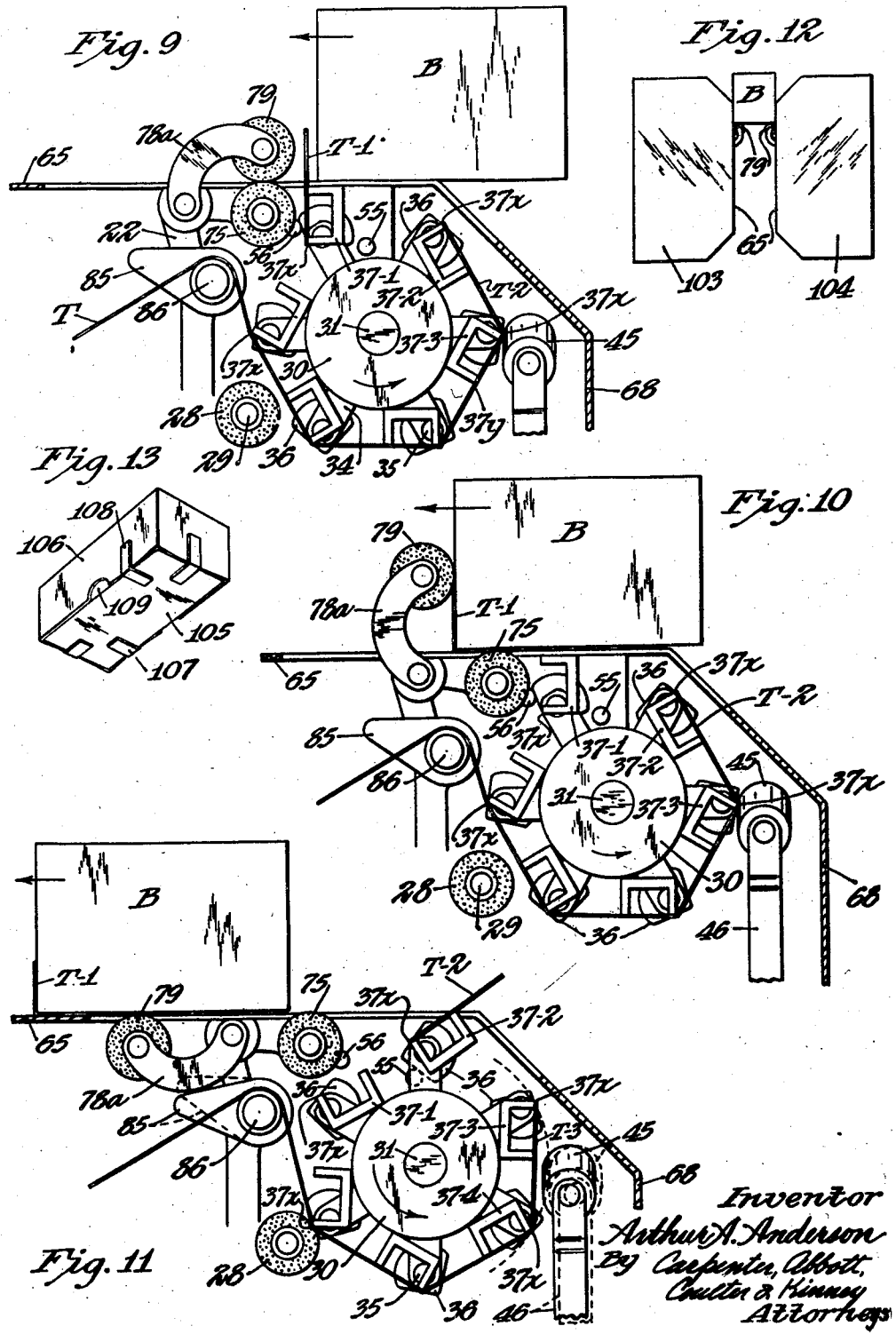

Patented Nov. 21, 1944

2,363,277

UNITED STATES PATENT OFFICE 2,363,277

ADHESIVE TAPE DISPENSER AND APPLIER

Arthur A. Anderson, Rose Township, Ramsey County, Minn., assignor to Minnesota Mining & Manufacturing Company, St. Paul, Minn., a corporation of Delaware Original application June 27, 1941, Serial No. 400,143. Divided and this application January 1, 1944, Serial No. 516,717

21 Claims. (Cl. 216—29)

This invention relates to devices for dispensing and applying tape, especially pressure-sensitive adhesive tape, i. e., tape which is normally tacky without the aid of solvents or heat.

This application is a division of my co-pending application Ser. No. 400,143, filed June 27, 1941.

The present invention has among its objectives the following:

To provide a simple device whereby pieces of pressure-sensitive adhesive tape of predetermined length are accurately measured, severed, dispensed and applied to objects brought into engagement therewith;

To provide an automatic device for rapidly sealing and/or labeling packages in factory assembly lines with pressure-sensitive adhesive tape direct from standard commercial supply rolls of such tape;

To provide such a device which will operate at high speed but whose dispensing speed is automatically adjusted to the speed at which the dispensed lengths of tape are removed, i. e., which will never dispense faster than the rate at which the tape is being consumed or used, so as to be suitable for slow and/or intermittent operation as well as high speed continuous operation;

To provide a simple device whereby a plurality of objects such as boxes, bags, packages, letters, folders, or the like, may be automatically sealed with accurately measured predetermined lengths of pressure-sensitive adhesive tape in rapid succession simply by propelling the objects to be sealed into successive engagement with the said device;

To provide a simple device whereby units of printed pressure-sensitive adhesive tape may be rapidly applied to, and accurately positioned upon, a plurality of objects as they are fed to the device.

Briefly the invention provides a device having means for feeding a piece of adhesive tape into a predetermined position to be engaged by an article upon movement of the latter into contact with the piece of tape, means for applying said piece of tape to said article upon said movement of the article, and means for automatically advancing a succeeding piece of tape into applying position following each applying operation, so that a severed piece of tape is waiting in position for application to the next article. The device may have power driving means for operating the feeding means.

The specific machine that is described and illustrated in the following description and drawings as illustrative of my invention is a portable electrically operated automatic tape dispenser and applier, particularly suited for use in factory assembly lines and in stores for rapid sealing of the edges of boxes and packages with accurately measured uniform lengths of pressure-sensitive adhesive tape.

In the accompanying drawings and description the end of the machine at which the operator stands when facing the machine to operate it is called the front end, and the terms "right" and "left" are from the point of view of such operator.

Figures 1 and 2 are left and right side elevations, respectively, of the machine with the left and right sides, respectively, of the casing broken away. In Figure 2 the motor is not shown.

Figure 3 is a plan view of the machine with the top of the casing broken away.

Figure 4 is a front elevation of the machine with the front of the casing broken away.

Figure 5 is a vertical section taken on the line 5—5 in Figure 3 showing the Geneva wheels and mechanism for starting and stopping the motor (motor not shown in Figure 5).

Figure 6 is a radial sectional view of a cutter arm in dispensing position taken on the line 6—6 in Figure 1.

Figure 7 is a side elevation of a cutter.

Figure 8 is a circuit diagram.

Figures 9, 10 and 11 are left side elevations of the cutter wheel and applier mechanism with the left side of the casing broken away showing a box before, during and after sealing, respectively.

Figure 12 is a diagrammatic view of two machines positioned to seal two edges of one box simultaneously.

Figure 13 is a perspective view of the under side of a box that has been sealed by a machine embodying the present invention.

To the base 21 is rigidly attached the upright frame 22 which in the present embodiment is cast in one long relatively narrow piece with bosses at proper points to which are attached the various parts of the machine, all of said parts being supported directly or indirectly by the frame 22. Base 21 may be of heavy weight to prevent movement of the portable machine while in use.

The supply roll R of pressure-sensitive adhesive tape T is carried on the tape roll holder drum 23 towards the rear of the machine while the mechanism for withdrawing the tape from the roll, propelling it through the machine, dispensing it in lengths, and positioning it ready for removal and/or application to boxes, packages, envelopes, etc., is towards the front of the machine.

Tape holder drum 23 may be of a size to receive the standard commercial sizes of rolls of pressure-sensitive adhesive tape such as that sold under the trade-mark "Scotch," but if desired, the machine may be provided with several interchangeable drums of varying sizes.

The periphery of tape holder drum 23 is provided at intervals with ridges 23a extending parallel to the drum's axis so as to insure a tight fit between the drum and the roll of tape notwithstanding any possible slight variance in actual size of rolls that are used from time to time. The ridges also help to prevent slipping.

Tape holder drum 23 is rotatably mounted on frame 22 by means of axle-bolt 24 so that its axis is parallel to the base 21 and at right angles to the upright frame 22. It is aligned so that the full width of tape T will contact the cutting elements or edges on the cutter wheel 30 as the tape is drawn forward from roll R through the machine.

Tape drum 23 is journaled onto an unthreaded portion 24b of axle-bolt 24 so as to turn freely thereon between the axle-bolt head 24c and a flange 24a (Figure 3). Boss 22a is provided as a part of frame 22 to provide adequate support for axle-bolt 24, the end of which is in threaded engagement with the boss. In order to make this threaded engagement sufficiently tight so as to make the axle-bolt relatively rigid in the frame, the hole in the boss which receives the axle-bolt is enlarged for a limited depth to receive a spiral spring 24d which is concentric with the axle-bolt and which is loaded to press the axle-bolt (by pressing the flange 24a) in a direction away from the boss 22a. Axle-bolt head 24c is knurled to form a thumb-turn. The axle-bolt may be turned thereby to permit adjustment of the tape drum 23 laterally in respect to the machine as a whole so as to adjust roll R of tape T behind cutter wheel 30 in proper alignment.

An idler roller 25 is rotatably mounted in a manner hereinafter described in the upper part of frame 22 approximately midway between tape holder drum 23 and cutter wheel 30 over which the tape may be led as it passes forwardly from the supply roll to the cutting mechanism, its non-adhesive side contacting the idler roller.

A second idler roller 26 around which the tape may be passed before it passes around the first idler roller is journaled onto horizontal shaft 27 which is rigidly fixed to boss 22b (Figure 4) on the lower part of the upright frame 22 below the first idler roller 25. The outer end of shaft 27 is threaded to receive thumb-turn 27a. Between the thumb-turn and the idler roller and likewise between the boss and the idler roller, are leather washers 27b so that when the thumb-turn is tightened, movement of the idler roller 26 is retarded because of the friction of the washers pressing against its two end surfaces.

In the present embodiment, the tape T is withdrawn from the supply roll R and propelled through the machine by reason of its temporary adherence to a series of tape-gripping elements which are carried by the cutter wheel 30, the latter being a part of the dispensing mechanism at the forward part of the machine. The cutter wheel 30 carries a series of "cutters" 37 that are pivotally mounted in spaced relationship around the periphery of the cutter wheel 30. These cutters 37 are shaped and positioned to provide in one member both the tape-gripping elements or surfaces 37a—37b and also the severing edges 37x (Figure 7).

Ordinarily the tension on the tape as it is being withdrawn from the supply roll by the pull of the cutter wheel, causes it to press against the tape-gripping elements 37a and 37b with enough force to make it adhere to said elements sufficiently to enable the elements to hold or grip the tape until it is removed at the dispensing station. But if atmospheric or other conditions require a greater pressure to be exerted, a pressing member may be employed to press the tape more firmly against the gripping elements. Such pressing member may be a roller 28 of resilient material such as rubber, preferably soft gum rubber, rotatably mounted on shaft 29 and positioned so that it presses against the gripping elements 37a, successively, as the cutter wheel 30 turns them past the roller.

Cutter wheel 30 is rigidly mounted on cutter wheel shaft 31 which is journaled into boss 22c perpendicular to the upright frame 22 and parallel with the base 21 and parallel with the axis of tape holder drum 23. Cutter wheel 30 carries a plurality of radially extending cutter arms 34. The number of cutter arms may vary. In the present embodiment there are six, spaced at intervals of 60°. Into the end of each cutter arm 34 there is journaled a cutter shaft 35 which extends parallel with the axis of cutter wheel 30. On the right end of each cutter shaft 35 there is rigidly fixed a quadrant shaped cutter cam 36. On the left end of each cutter shaft 35 there is rigidly removably attached a cutter 37.

As cutter wheel 30 turns, the weight of cutters 37 tends to turn their respective cutter shafts 35. As is hereinafter described, it is desirable that cutter shafts 35 be allowed to turn only when they are made to turn by their respective cams 36 striking pins 55 and 56. Some form of braking means is desirable. Accordingly, in each cutter arm 34 a hole extending radially with respect to cutter wheel 30 is bored from the outer tip of the arm inwardly toward, but not as far as, the center of cutter wheel 30, the center line of the hole intersecting the center line of the cutter shaft 35. Spiral spring 38 is placed therein (Figure 6) loaded to press the leather disc 39 against the cutter shaft 35 sufficiently to brake the shaft against casual turning but not to brake it against the turning caused by cam 36 striking the pins 55 and 56.

Cutters 37 may be of square or rectangular or other shape in cross section. In the present embodiment they are U shaped, each tip of the U being ground to form a cutting edge (Figure 7). Surfaces 37a and 37c are ground, polished and lapped to form the cutting edge 37x; likewise surfaces 37b and 37d are ground, polished and lapped to form the cutting edge 37y. When a cutter 37 is fastened to its cutter shaft 35 in the position shown in Figure 7, then 37x is the cutting edge that is in use. When edge 37x becomes dull, screws 40 may be removed, the position of the cutter reversed, and the cutter reattached to cutter shaft 35 by screws 40 through holes 41, thereby placing the fresh edge 37y in position to be used as a cutting edge.

The cutting edges of each cutter are preferably parallel with the axis of cutter wheel 30, and therefore parallel with the axis of the tape holder drum 23.

Both of the lands 37a and 37b (Figure 7) of any one cutter lie in approximatley the same plane, and it is this series of pairs of lands around the cutter wheel 30 that form the tape-gripping elements to which the tape T adheres so that the turning of the cutter wheel draws the tape through the machine.

Cutters 37 are preferably of very hard material. In the present embodiment they are of case hardened steel.

Forwardly of the cutter wheel 30 is positioned the "anvil member" which co-acts with the cutter wheel to sever the tape by reason of the severing edges 37x pressing the tape against said anvil member. In the present embodiment the anvil member is a rotatably mounted cylinder or cutting roller 45 positioned to permit it to contact the cutting edges 37x of each of the cutters 37 successively as the cutter wheel 30 turns.

The cutting roller 45 and the cutting edges 37x may be shaped and/or positioned so that a cutting edge contacts the roller at only a single point at any one time with the result that in operation, an edge contacts the roller point by point along the edge's length which is preferable to having the full length of the edge contact the roller all at once. In the present embodiment this is accomplished by positioning the cylindrical cutting roller 45 in angular relation to the straight edges 37x.

This angular relation makes it necessary for the cutter or the cutting roller or both to move for some distance in relation to each other so as to bring the full length of any one cutting edge 37x into contact point by point with the cutting roller 45. In the present embodiment substantially all of the relative movement of the two parts past each other is effected by movement of the cutters 37.

Since each cutting edge thus moves some distance in a circular path while it is in contact with the cutting roller, and since the cutting roller is preferably made of a relatively unyielding substance; and since it is preferable to have the full length of each cutting edge contacting the cutting roller at a substantially uniform pressure and at a pressure approximately equal to that of the other cutting edges, and for other reasons, the cutting roller is held yieldably rather than rigidly in its normal position.

For this purpose an angular member having an upwardly extending arm 46 and a horizontally extending arm 46a is pivotally mounted on the upright frame 22 by being journaled onto the axle-bolt 47 with its upright arm 46 equipped to hold rotatably the cutting roller 45 and with the end of its horizontal arm 46a pierced to receive the vertical threaded shaft 48. Axle-bolt 47 pierces boss 22d and is in threaded engagement therewith, said engagement being sufficiently tight to make axle-bolt 47 relatively rigid in the frame 22 but adjustable by turning axle-bolt head 47a.

The axis of the axle-bolt 47 is preferably parallel to the cutting edges of the cutters although it may vary from that so long as no point of the cutting roller is moved so far that it fails to contact the cutter at the required pressure. In the present embodiment the desired angular relationship between the cutting roller 45 and the cutting edges 37x is secured by bending the upright arm 46 to the left of vertical (Figure 4) to form an acute angle with the axis of axle-bolt 47. However such desired angular relationship may also be secured by other means, for example, by placing axle-bolt 47 at the required angle to horizontal and by tipping the upright shaft 48 so that it is perpendicular to the axle-bolt; or the axle-bolt 47 may be horizontal, the upright arm 46 vertical with the cutting roller 45 mounted at an angle therein; etc.

The lock nut 49, being in threaded engagement with the shaft 48 below the horizontal arm 46a, is set so that when the arm rests upon it, the cutting roller 45 will occupy a desired position, i. e., at the nearest point to the cutter wheel 30 to which it comes at any time during the operation of the machine. The horizontal arm 46a is yieldably held down against the lock nut 49 by the heavy spiral spring 51, whose upper end is adjustably stopped by the lock nut 50, at a tension sufficient to exert a pressure between severing edges 37x and cutting roller 45 during their time of contact to sever the tape T.

The anvil member 45 is preferably made of relatively hard material, though preferably softer than the cutting edges 37x. In the present embodiment, it is of steel. Brass, copper, aluminum, and other softer materials have been used successfully, but rollers of such materials tend to become scored too rapidly by the cutters. The roller's periphery is preferably smooth. It gradually becomes scored by the cutting edges but will stand considerable use before needing replacement.

Slightly above cutter wheel 30 two cutter cam pins 55 and 56 are rigidly fixed to frame 22, protruding outwardly therefrom toward the cutter wheel. Pin 55 is positioned so as to strike each one of the cutter cams 36 on one of their two straight sides as cutter wheel 30 turns counter-clockwise (Figures 1 and 11). This turns cutter shafts 35 one by one so as to raise the cutters from the cutting position of cutter 37—2 to the dispensing position of cutter 37—1 as they are shown in Figures 9 and 10. Pin 56 is positioned so as next to strike the cams on their other straight sides as they pass and thereby to lower the cutters back again from dispensing to cutting position.

Cutter wheel 30 is driven by worm gear reduction motor M through the Geneva wheels 60 and 61, which transmit the motion intermittently, as is well known in the art. Motor M is rigidly fixed to the frame 22 by being mounted onto the hollow boss 22e by screws 58.

Power shaft 62 is the worm wheel shaft of the worm gear reduction box of the motor M and is journaled into boss 22f which is apart of upright frame 22.

On shaft 62 is rigidly mounted the driver Geneva wheel 60 which carries two driving pins 60a and 60b located 180° apart.

The driven Geneva wheel 61 is rigidly mounted on the end of cutter wheel shaft 31 opposite to the end on which cutter wheel 30 is mounted. It has six radial slots located 60° apart. At each half revolution of the Geneva driver 60, either the pin 60a or the pin 60b engages one of these slots and turns the driven Geneva wheel 61, and with it cutter wheel 30, one-sixth of a turn. Just as either pin (60a or 60b) is leaving any one slot at the end of a turn, the convex surface 60c of Geneva driver 60 engages the next successive concave surface 61a of driven Geneva wheel 61 so that wheel 61, and with it cutter wheel 30, is stopped precisely at the end of 60° of turn and is held there until the next pin (60a or 60b) moves around to engage the next slot.

The top of upright frame 22 is finished so as to support a guiding means in the form of a tablelike plane surface preferably parallel with the base 21, across which are propelled the boxes, packages, etc., which are to be sealed. This table may conveniently take the form of the top of a sheet metal case which encloses the entire machine, as shown in the present embodiment, with a plane surface top 65, sides 66 and 67, and ends 68 and 69, all removably secured to base 21 by screws 70. Most of the left side 66 is in the form of a door 71 hinged at the bottom and held by a latch 72 that engages the top 65 so that the machine may be serviced therethrough without removing the entire casing. A rectangular aperture or slot ABCD is cut out of top 65 (its position is shown in dotted lines in Figure 3) to permit certain parts of the machine to extend up through the top, as hereinafter described.

Below the slot and immediately to the rear of and slightly above cutter wheel 30 a lower roller 75 is journaled on a shaft 76 which is rigidly fixed in frame 22 perpendicular thereto and parallel with base 21. The top of this lower roller is preferably flush with or perhaps slightly above the upper surface of casing top 65, but it may also be slightly below said surface.

To the rear of this lower roller there is journaled into boss 22i the shaft 77 on which are rigidly mounted the two parallel arms 78a and 78b which curve upwardly and forwardly, extending through the slot, and between whose ends is rotatably mounted the upper sealing roller 79. The curve in the arms may be angular or a square elbow-like turn, or of any convenient shape to prevent their contacting the objects being propelled through the machine.

The right end of roller arm shaft 77 extends for a distance beyond the supporting boss 22i. Around this extending portion of the shaft, concentric with its axis, is placed a spiral spring 80, its right end fixed to the shaft, its left end to boss 22i and loaded to revolve the shaft in a direction to press roller 79 downwardly upon roller 75.

The two sealing rollers 75 and 79 are preferably of a resilient material such as rubber.

The drawings show roller 75 as being directly below roller 79. It may be slightly forward of the position shown. Also it may be considerably to the rear thereof so long as the axis of upper roller 79 does not come below the top surface of the table or top 65. If the top of lower roller 75 is below the surface 65 so that it does not serve as a sealing roller, then the roller 75 need not be a rotatable element, but may be any means that will stop the forward swing of upper roller 79 and also bend the piece of tape T—1 upwardly in the manner hereinafter described in the "Mode of operation."

Directly below the upper sealing roller arm 78b the switching arm 85 is rigidly fixed to switching shaft 86 which is journaled into frame 22 perpendicular thereto at the point where the frame is reinforced by boss 22g. Idler roller 25, previously described, is journaled on the left end of shaft 86.

Switching arm 85 extends outwardly from its shaft 86 so that its end will be contacted and pressed downwardly by the convex portion of upper sealing roller arm 78b when the latter turns counter-clockwise (Figure 11) about the axis of its shaft 77.

At the opposite or right end of switching shaft 86 the spring arm 87 is rigidly removably attached thereto by screw 88. Its downwardly extending free end is attached to the boss 22e by a spiral spring 89 which is adjusted so that after switching arm 85 has been depressed by the upper sealing roller arm 78b, the spring 89 will draw spring arm 87 and with it switching arm 85 back again to the normal or starting position which they are shown as occupying in all the figures except Figure 11. Retention in normal position may be secured by a suitable adjustable stop against which spring 89 may hold the arm, or, as in the present embodiment, by adjusting the tension of spring 89 to equal the downward pull exerted by the weight of switching arm 85 when the parts are in normal or starting position.

A leaf spring 90 is also removably rigidly attached to the right end of switching shaft 86 at the same point as is spring arm 87 and by the same screw 88. It extends downwardly and is adjusted in a position forward of spring arm 87 so that when switching arm 85 is depressed, the leaf spring 90, turning in unison with it by reason of their rigid attachment to the same switching shaft 86, will press the "on" point 91 of reset "micro switch" 92 which is rigidly fixed to frame 22 at boss 22h.

By a "reset" switch is meant one having two pins, one of which is pressed to make the circuit and the other to break the circuit, such that when the "on" pin is pressed, the switch remains closed until the "off" pin is pressed, whereupon the switch opens and the "on" pin is raised to initial open position.

On the opposite or front side of switch 92 is the "off" point 93. This is pressed by leaf spring 94 which is rigidly attached to the front side of the switch by a screw. Leaf spring 94 is adjusted to bear against the switch cam wheel 95 which is adjustably mounted on power shaft 62 and adjusted so that its cams 96 as they pass will press leaf spring 94 rearwardly far enough to press the "off" point 93 of the switch 92.

The supply of electric power to the entire machine may be controlled by a snap switch 100 shown set into the right side 67 of the casing. Connections are shown in the circuit diagram Figure 8. A terminal block may be used, its housing being shown at 101.

The top 65 of the casing may be provided with guides (not shown) to prevent lateral movement of boxes, etc., as they are being propelled across the machine during sealing and to permit a piece of tape to be placed on each box at a uniform distance from a given edge of such box.

*Mode of operation*

A roll R of pressure-sensitive adhesive tape T is mounted on the drum 23, and positioned so that when the tape is led from the supply roll R to the cutter wheel 30, the adhesive side faces up. The axle-bolt 24 on which the drum 23 is journaled, is moved to the right or left (in relation to the machine) by turning the thumb-turn 24c until the roll R is aligned directly behind the cutters 37 on the cutter wheel 30.

The tape is led from the roll R over the idler roller 25 to the cutter wheel 30. Since the tape is withdrawn from the supply roll and propelled through the machine by the cutter wheel, and since the propelling force of the cutter wheel is exerted on the tape by reason of the tape's temporary adherence to the series of tape-gripping elements 37a—37b on the cutters 37 which are on the cutter wheel, it is necessary to secure proper adhesion between the tape and the surfaces 37a—37b. The pull necessary to withdraw the tape from the roll over the idler roller 25 usually provides pressure enough to secure the necessary adhesion. But if, due to atmospheric or other conditions, greater pressure is needed, the tape may be led first around idler roller 22 as shown by the dotted line T' in Figure 1 and then around roller 25. The tape's adhesive side contacts roller 26, and consequently there is temporary adherence as the tape is drawn through the machine so that braking the roller 26 brakes the movement of the tape. To effect this, thumb-turn 27a may be tightened to press the leather washers 27b against the ends of roller 26. The machine may be equipped with the pressing roller 28 either as an alternative to the use of roller 26 or in addition thereto. Roller 28 presses the tape into firmer adhesive engagement with the surfaces 37a as they are successively turned past it.

The tape is then trained around the cutter wheel in adhesive contact with the tape-carrying surfaces 37a—37b. In practice this is best done by hand as far as cutter 37—3 (Figure 9) and by the power mechanism (whose operation is hereinafter described) for the rest of the way, that is, until the first severed length of tape T—1 is held out by the cutter 37—1 in dispensing position at the dispensing point or station (Figure 9).

The box B, or other object to which tape is to be applied around its lower edge in the manner shown in Figure 13, is placed on the top 65 of the casing and is pushed or otherwise advanced rearwardly along the top 65 toward the severed vertically held piece of tape T—1 in the direction of the arrow (Figure 9). The box contacts the tape T—1 and continues to move until the box is pressing the tape T—1 against the upper sealing roller 79. The adhesive side of the tape faces the box B and it therefore adheres thereto. As the box continues to advance, the roller 79 is thereby forced to swing rearwardly and upwardly on the pivotal mounting 77 of its supporting arms 78a and 78b. This presses the upper portion of the tape T—1 against the end of the box B by reason of the roller 79 rolling upwardly along the tape's length with the spiral spring 80 acting to press the roller 79 against the advancing box (Figure 10). After the roller 79 has reached the top of its swing, the continued advance of the box causes it to swing further about the shaft 77 whereupon it moves downwardly along the tape T—1 until it reaches the lower edge of the box and is entirely over-ridden by the advancing box, as in Figure 11.

Meanwhile, directly after the box first contacts the tape T—1 and begins to carry it along, the lower portion of the piece of tape T—1 is thereby pulled loose from the tape-gripping elements 37a—37b on the cutter 37—1, and is bent or directed upwardly towards the bottom of the box by the lower roller 75. If roller 75 is positioned high enough to contact the bottom of the box, it will then serve as a sealing roller also and will press tape T—1 against the bottom of the box. In either case, the upper roller 79 presses the full length of the lower portion of tape T—1 upwardly against the bottom of the box as the box continues to advance over it, as shown in Figure 11.

Thus the full length of the piece of tape T—1 is pressed against the side and bottom of the box. Some parts of it are pressed twice and all of it may be pressed twice if lower roller 75 is positioned high enough to act as a sealing roller.

The above described applier means and mode of operating the same provide a tight seal and if desired, the spring 80 which presses the upper roller 79 against the box, may be tightened enough to bend the sides 106 of a box cover inwardly until they touch the sides 109 of the box and to seal them in that position, as shown in Figure 13.

The box continues to be advanced after sealing until it is clear of the roller 79, whereupon the spring 80 returns the roller to its starting position by swinging it forwardly until it is stopped by resting upon the lower roller 75.

In the meantime the downward movement of upper roller arm 78b has depressed the switching arm 85 (Figure 10) which, through its shaft 86, moves spring arm 87 (Figure 5) and with it leaf spring 90 forwardly a sufficient distance to press the "on" point 91 of reset switch 92.

The box B, advancing at what has been found to be a reasonable operating speed, will almost immediately thereafter have passed on beyond the upper roller 79, whereupon roller 79 is swung back to its starting position (Figure 9) by spring 80 (Figures 3 and 4). The switching arm 85 is thereby released and is returned to starting position (Figure 9) by the pull of the spring 89 on arm 87 (Figure 2) which moves switching arm 85 by means of their common shaft 86; and this movement also removes the leaf spring 90 from the "on" point 91 of the switch, thus rendering the "on" point free to reset itself, i. e., to snap back into starting position when the "off" point is pressed later on.

Pressing the "on" point 91 of the switch 92, as above stated, starts the motor M which turns the power shaft 62 clockwise (Figure 5). The lower or driver Geneva wheel 60, being rigidly mounted thereon, turns with it and drives the upper Geneva wheel 61 in a manner well known in the art, namely, by reason of the driving pin 60a (in alternation with pin 60b) engaging one of the radially extending slots of the upper wheel.

When the lower Geneva wheel begins to turn, the upper wheel, by reason of the lowermost one of its six concave surfaces 61a being engaged by the upper one of the two convex surfaces 60c of the lower wheel, is held motionless until the said surface 60c is turned past the said concave surface 61a. At that moment the pin 60a engages its complementary radial slot in the upper wheel, which, being now free to turn, is turned counter-clockwise (Figure 5). Its movement for each turning impulse (by either of the pins 60a or 60b) is limited to 60° of turn because at the end of that distance the pin 60a (or 60b) leaves its radial slot thereby ceasing to drive the upper wheel and at the same moment the next convex surface 60c engages its complementary concave surface 61a, thereby locking the upper wheel against any further movement. At or about this time, one of the cams 96, which is on the adjustable switch cam wheel 95, presses the leaf spring 94 rearwardly (to the left in Figure 5) far enough to press the "off" point 93 of switch 92. The cam wheel 95 may be adjusted to switch off the motor at such a point that the motor will coast to a stop before the next pin 60b (or 60a) engages the upper wheel. Since no turning impulse is applied to the upper wheel from the time the pin 60a (or 60b) leaves its slot until the other pin 60b (or 60a) enters the next slot, the lower wheel has 120° of "coast" which has proved to be ample when the motor acts through worm gears, as in the present embodiment.

It is thus seen that the depressing of the switching arm 85 (Figure 11) and the prompt release thereof (both the depressing and releasing being initiated by the movement of the box B across the surface 65 of the casing top) causes the upper or driven Geneva wheel 61 to turn exactly 60°, then to stop and to be locked against further turning until the next box is advanced far enough to depress the switching arm again. The maximum amount of time that the box can be permitted to hold the sealing roller 79 down (and with it the switching arm 85—Figure 10), must be within the time it takes for the cam 96 to turn far enough to cause the "off" point 93 of switch 92 to be pressed, for if the yieldable pressure of leaf spring 90 against the "on" point (Figure 5) is continued, it will again press the "on" point so as to start the motor for a second cycle as soon as cam 96 coasts far enough to release the "off" point. As described above, in a reset switch such as is here illustrated, the "on" point resets as soon as the "off" point is pressed, and vice versa.

The upper Geneva wheel drives the cutter wheel 30, by means of their common shaft 31, counterclockwise (Figures 9, 10 and 11). The tape, as previously explained, is trained around the cutter wheel in contact with the tape-gripping surfaces 37a—37b, and it also passes over the severing or cutting edges 37x on each of the cutters 37. As the cutter wheel turns, these cutting edges successively press against the anvil member or cutting roller 45, each edge contacting the roller point by point along its own length until the entire length of the cutting edge has been pressed against the roller, whereby the tape which lies between the edge and the roller, is severed.

This severing is shown in the present embodiment as coming just at the end of a "dispensing cycle" or 60° movement of the cutter wheel. In Figure 9 the piece of tape T—2 is shown as having just been severed, the cutter wheel is motionless and the piece of severed tape is held on the surfaces 37a—37b of cutter 37—2 by reason of its adherence thereto, in readiness to be raised up at the end of the next cycle into the position which the piece T—1 now occupies in Figure 9.

In Figure 11 the next cycle is halfway completed. The turning of the cutter wheel has brought the cam 36 of cutter 37—2 into contact with cam pin 55 whereby cutter 37—2 is being raised into dispensing position. The piece 37—3 is not yet severed but will be at the end of the cycle when it is pressed between the cutting edge 37x of cutter 37—4 and the cutting roller 45. The cutter 37—1 which originally held the piece of tape T—1 has been turned back down again into cutting position by reason of its cam 36 contacting the cam pin 56.

Thus it is seen that, without touching the tape or any part of the machine, an operator may seal the bottom edges of a box in the manner shown in Figure 13 simply by propelling the box rapidly across the top of the illustrated machine, and that as soon as one piece of tape is thus applied a succeeding piece is quickly and automatically positioned in readiness for the next application.

Where two machines are placed with their "tops" facing each other (Figure 12) two edges of the same box can be sealed simultaneously. For example, the box in Figure 13 can be sealed with pieces 107 and 108 by being propelled only once between the machines in Figure 12.

Reference is made earlier in the description to threading a fresh roll of tape through the dispenser partly by hand and partly by the power mechanism. It may now be seen that the hand threading would go probably as far as cutter 37—3 in Figure 9 and that successive depressions of the switching arm 85 by hand would turn the cutter wheel until a piece of tape (as T—1 in Figure 9) is positioned for dispensing.

Dispenser and applier units embodying the principles of my invention may be built into packaging and wrapping machines, etc.

It will be apparent that very accurate measurement of lengths of tape can be secured. This is of especial advantage when dispensing and applying tape that is printed to form a series of labels, stickers, trade-mark emblems, etc.

"Tape" and "sheet material" are regarded as being interchangeable terms wherever used throughout the specification and claims, that is, "tape" is used generically to refer to sheets which are long in proportion to width.

Also the terms "top," "above," "below," etc., are relative terms and not limiting terms, since for example, the machine may be used when on its end or side as in Figure 12 in which position the "top" or table 65 would not be horizontal or uppermost.

I claim:

1. In an adhesive tape dispenser and applier adapted for sealing boxes and the like by application of a piece of tape about an edge thereof as the object is advanced, a table for guiding objects when advanced to and through sealing position, having an aperture over which the objects are passed and through which pieces of tape are fed for sealing, a resilient swinging roller, arms carrying said roller and normally positioning the roller with its axis above said aperture, said arms being pivotally mounted to permit said roller to swing back above said aperture and thence down into the aperture and means for yieldingly restraining said motion, said arms being shaped to prevent contact with objects being sealed, means for projecting successive pieces of tape through the aperture in front of said roller with the non-adhesive back toward the roller, the latter means releasably holding the lower ends only of the pieces of tape such that the lower end of each piece of tape when in sealing position is held below the aperture and a free portion projects through the aperture, so that when a box or like object is moved across the table and over the aperture the upper free portion of a projecting piece of tape will adhere to the face portion of the object and the swinging roller will ride up on the object and then down to and around the edge and across the bottom to press the tape in firm sealing contact around the edge and said roller will return to initial position after the object has passed over it, and means for automatically advancing a succeeding piece of tape into sealing position following each sealing operation.

2. In the device of claim 1, a fixed roller mounted below the initial position of the swinging roller and adapted, during a sealing operation, to bend the lower end portion of the piece of tape around the edge of the object being sealed as the latter advances thereover and to aid in releasing the lower end of the tape from the means holding it.

3. In the device of claim 1, control means responsive to movement of the swinging roller to initiate operation of the means for advancing a succeeding piece of tape to sealing position.

4. A machine of the character described comprising means for feeding a piece of adhesive material into a predetermined position to be engaged by an article upon movement of the latter in one direction, means for applying said piece of material to said article upon movement of the article in said direction, and an operative connection between said feeding means and said applying means for actuating said feeding means.

5. An adhesive tape dispenser and applier comprising means for feeding a piece of adhesive tape into a predetermined position to be engaged by an article upon movement of the latter in one direction, means for applying said piece of tape to said article upon movement of the article in said direction, and means for automatically actuating said feeding means in response to movement of said applying means.

6. A pressure-sensitive adhesive tape dispenser and applier comprising means for feeding a piece of pressure-sensitive adhesive tape into a predetermined position to be engaged by an article upon movement of the latter thereagainst, means for applying the piece of tape to the article upon said movement, and means for automatically actuating said feeding means in response to said movement of the article to automatically position a further piece of tape ready for application.

7. An adhesive tape dispenser and applier comprising means for feeding a piece of adhesive tape into a predetermined position to be engaged by an article upon movement of the latter thereagainst, means for applying said piece of tape to said article upon said movement, and means connecting said feeding means and said applying means whereby operation of the latter produces a further operation of the feeding means to automatically position a further piece of tape.

8. An adhesive tape dispenser and applier comprising means for feeding a piece of adhesive tape into a predetermined position to be engaged by an article upon movement of the latter thereagainst, power driving means for operating the feeding means, means for applying said piece of tape to said article upon said movement, and means connecting said power driving means and said applying means whereby operation of the latter produces a further operation of the feeding means to automatically position a further piece of tape.

9. A machine of the character described comprising means for feeding a piece of adhesive material into a predetermined position to be engaged by an article upon movement of the latter in one direction, means for applying said piece of material to said article including a presser normally disposed at the side of said piece of material opposite said article so that said piece of adhesive material will be pressed between said article and said presser and thus adhesively attached to the article upon movement of said article in said direction, said presser being movable by and with said article during continuation of said movement of the article, means for actuating said presser in the other direction into normal position, and an operative connection between said presser and said feeding means for actuating the latter.

10. An adhesive tape dispenser and applier comprising means for feeding a piece of adhesive tape into a predetermined position to be engaged by an article upon movement of the latter in one direction, means for applying said piece of tape to said article including a presser normally disposed at the side of said piece of tape opposite said article so that said piece of adhesive tape will be pressed between said article and said presser and thus be adhesively attached to the article upon movement of said article in said direction, said presser being movable by and with said article during continuation of said movement of the article, means for actuating said presser in the other direction into normal position, and means for automatically actuating said feeding means in response to movement of said applying means.

11. An adhesive tape dispenser and applier comprising means for feeding a piece of adhesive tape into a predetermined position to be engaged by an article upon movement of the latter thereagainst, means movable in response to pressure of the article thereagainst for applying said piece of tape to said article upon said movement, and means connecting said feeding means and said applying means whereby operation of the latter produces a further operation of the feeding means to automatically position a further piece of tape.

12. An adhesive tape dispenser and applier comprising means for feeding a piece of adhesive tape into a predetermined position to be engaged by an article upon movement of the latter thereagainst, power driving means for operating the feeding means, means movable in response to pressure of the article thereagainst for applying said piece of tape to said article upon said movement, and means connecting said power driving means and said applying means whereby operation of the latter produces a further operation of the feeding means to automatically position a further piece of tape.

13. An automatic pressure-sensitive adhesive tape dispenser and applier comprising a dispensing mechanism for withdrawing pressure-sensitive adhesive tape from a roll and feeding successive pieces into a predetermined applying position ready for engagement by an article upon movement of the latter toward and against the tacky side of a positioned piece of tape, means for applying the positioned piece of tape to the article including a movable presser normally disposed at the back of the piece of tape and adapted to be moved by the article when the latter is moved against the piece of tape and presser, means for restoring the presser to normal position following application of the piece of tape to the article, and driving means actuated by movement of said movable presser for driving said dispensing mechanism to automatically feed a further piece of tape to applying position following application of the preceding piece of tape.

14. An automatic pressure-sensitive adhesive tape dispenser and applier comprising a dispensing mechanism for withdrawing pressure-sensitive adhesive tape from a roll and feeding successive pieces into a predetermined applying position ready for engagement by an article upon movement of the latter toward and against the tacky side of a positioned piece of tape, means for applying the positioned piece of tape to the article including a movable presser normally disposed at the back of the piece of tape and adapted to be moved by the article when the latter is moved against the piece of tape and presser, means for restoring the presser to normal position following application of the piece of tape to the article, and power driving means actuated by movement of said movable presser for driving said dispensing mechanism to automatically feed a further piece of tape to applying position following application of the preceding piece of tape.

15. A device for dispensing pressure-sensitive adhesive tape and applying it about the edge of an object comprising means for withdrawing tape from a supply roll, means for cutting it into accurately measured pieces of predetermined length, means for thrusting out a cut piece and releasably holding it by adhesive contact therewith at a dispensing station in a position to be contacted on its adhesive side by a side surface of the object being taped, and sealing means for pressing the piece into adhesive engagement with the side and bottom surfaces of the object.

16. A device for dispensing pressure-sensitive adhesive tape and applying it about the edge of an object comprising means for withdrawing tape from a supply roll, means for cutting it into accurately measured pieces of predetermined length, means for thrusting out a cut piece and releasably holding it by adhesive contact therewith at a dispensing station in a position to be contacted on its adhesive side by a side surface of the object, sealing means positioned to press the tape against the side and bottom when the object is propelled adjacent thereto, a support for guiding the object, and power driving means and associated control means adapted to automatically advance the next piece of tape to dispensing position after the preceding piece has been applied.

17. An automatic box sealer comprising means for withdrawing pressure-sensitive adhesive tape from a supply roll, means for cutting it into accurately measured pieces of predetermined length, means for successively thrusting out and releasably holding cut pieces of the tape by adhesive contact therewith at a dispensing station in a position such that each successive cut piece may be contacted on its adhesive side by the leading side surface of a box with a free portion of tape projecting below the box, sealing means positioned to press the piece of tape against the side and bottom of the box when the box is propelled adjacent thereto, a supporting surface for guiding the box having an aperture over which the box is passed and through which the piece of tape extends when held at the dispensing station, and power driving means and associated control means adapted to automatically advance the next piece of tape to dispensing position after the preceding piece has been applied.

18. In a pressure-sensitive adhesive tape dispenser and applier, means for supporting and guiding boxes or other objects which are to be advanced into position for sealing by application of a piece of tape about the leading edge, applier means for pressing a piece of tape about such an edge when the object to be sealed is moved into engagement therewith, feeding means for unwinding tape from a roll thereof and advancing it and means for automatically severing successive terminal portions into pieces of desired length, means for releasably holding each severed piece of tape at one end only with a substantial portion extending free of support and bringing the severed piece into position for application with the free portion of the tape extending into the path of the object to be sealed so that the object will press against the adhesive face of the tape when moved into engagement with the applier means, driving means and associated control means for automatically actuating said feeding means in response to said movement of the object to automatically advance the next piece of tape into position for application after the preceding piece has been applied, so that a severed piece of tape is waiting in position for application at the end of each cycle and objects may be automatically sealed when moved into engagement with the applier.

19. In an adhesive tape dispenser and applier, means for supporting and guiding boxes or other objects which are to be advanced into position for sealing by application of a piece of tape about the leading edge, applier means for pressing a piece of tape about such an edge when the object to be sealed is advanced into engagement therewith, means for unwinding tape from a roll thereof and advancing it and means for automatically severing successive terminal portions into accurately measured pieces of desired length, means for releasably holding each severed piece of tape at one end only with a substantial portion extending free of support and for bringing the severed piece into position for application with the free portion of the tape extending into the path of the object to be sealed so that the object will press against the adhesive face of the tape when brought into engagement with the applier means, power driving means and associated control means adapted to automatically advance the next piece of tape into position for application after the preceding piece has been applied, so that a severed piece of tape is waiting in position for application at the end of each cycle and objects may be automatically sealed when moved into engagement with the applier, said control means being actuated by the movement of said applier means so that the next piece of tape will not be advanced until after the said engagement.

20. In a device for dispensing and applying adhesive tape, means for holding a supply roll of tape, a wheel adapted to receive tape from the roll, said wheel having tape-gripping means positioned thereon adapted to contact a portion of the tape, means on the wheel and means adjacent the wheel adapted to coact to sever the tape, one of the said coacting means comprising a cutting edge and the other comprising an anvil member against which the edge may press the tape, the said coacting means being positioned so that the tape is pressed therebetween as the wheel rotates, thereby severing the tape with the severed piece still held by the tape-gripping means, driving means and associated control means for intermittently rotating said wheel so that the machine operates in dispensing cycles to bring successive pieces of severed tape to a dispensing station in step-by-step fashion, applier means located at the dispensing station and comprising a pressing member positioned adjacent the severed piece of tape when brought to the dispensing station and adapted to press the piece against an object when the object is advanced against it, said control means being actuated by movement of said pressing member to initiate a succeeding cycle of operation.

21. In a device for dispensing and applying adhesive tape, a rotatable wheel having a plurality of peripheral gripping means extending parallel to its axis adapted to receive tape from a roll thereof and carry it to a dispensing station, each of said gripping means being adapted to turn on a peripheral axis parallel to the axis of the wheel, means for severing the tape into successive pieces as said wheel rotates so that each severed piece is thereafter held by gripping means at one end only leaving the other end free, means for turning each gripping means after tape held thereby has been severed to turn the held piece of tape so that it extends outwardly from the wheel in position for removal when rotation of the wheel brings it to the dispensing station, means for intermittently rotating said wheel so that successive pieces of severed tape are brought to the dispensing station in step-by-step fashion, and mechanical means for pressing the outwardly extending pieces of tape against objects brought into operative relation therewith.

ARTHUR A. ANDERSON.